United States Patent [19]

De With et al.

[11] Patent Number: 5,570,132
[45] Date of Patent: Oct. 29, 1996

[54] DEVICE FOR TRANSMITTING OR STORING DIGITAL TELEVISION PICTURES, AND DEVICE FOR RECEIVING SAID PICTURES

[75] Inventors: Peter H. N. De With; Wilhelmus J. Van Gestel, both of Eindhoven, Netherlands

[73] Assignee: U.S. Philips Corporation, New York, N.Y.

[21] Appl. No.: 254,092

[22] Filed: Jun. 6, 1994

[30] Foreign Application Priority Data

Jun. 7, 1993 [EP] European Pat. Off. .............. 93201613

[51] Int. Cl.$^6$ ..................................................... H04N 7/52
[52] U.S. Cl. ........................... 348/408; 348/423; 386/112
[58] Field of Search ..................................... 358/339, 335; 348/408, 423, 469; H04N 7/133, 7/52

[56] References Cited

U.S. PATENT DOCUMENTS

| | | | |
|---|---|---|---|
| 4,398,217 | 8/1983 | Peters | 348/404 |
| 4,901,075 | 2/1990 | Vogel | 341/63 |
| 4,907,101 | 3/1990 | Keesen et al. | 360/48 |
| 5,047,852 | 9/1991 | Hanyu | 358/339 |
| 5,339,108 | 8/1994 | Coleman | 348/408 |
| 5,444,490 | 8/1995 | De With et al. | 348/423 |

FOREIGN PATENT DOCUMENTS

| | | | |
|---|---|---|---|
| 0286184 | 10/1988 | European Pat. Off. | G06F 15/347 |
| 0578308 | 1/1994 | European Pat. Off. | H04N 5/92 |

*Primary Examiner*—Howard W. Britton
*Attorney, Agent, or Firm*—Laurie E. Gathman

[57] ABSTRACT

Device for transmitting or storing digital television pictures in which a maximum possible number of data of a group of transformed pixel blocks ($DB_1 \ldots DB_{12}$) is transmitted in the form of variable-length code words ($V_1 \ldots V_N$) in a corresponding channel block of predetermined length (FIG. 5A). If all code words of the groups of blocks are accommodated in the corresponding channel block (FIG. 5C), the channel block will also comprise surplus data of other blocks. The boundary, within a channel block, between these code words and surplus data is transmitted in the form of an address (P) which is accommodated at a predetermined position of the channel block. If the channel block length is inadequate for transmitting all code words of the group of blocks, the channel block (FIG. 5B), will comprise at least the code words which are representative of the DC coefficient and a number of important AC coefficients of each block. Said code words are accommodated in successive channel block sections ($L_1 \ldots L_{12}$), with a code (C) for the length of these channel block sections being transmitted at predetermined positions of the channel block.

17 Claims, 8 Drawing Sheets

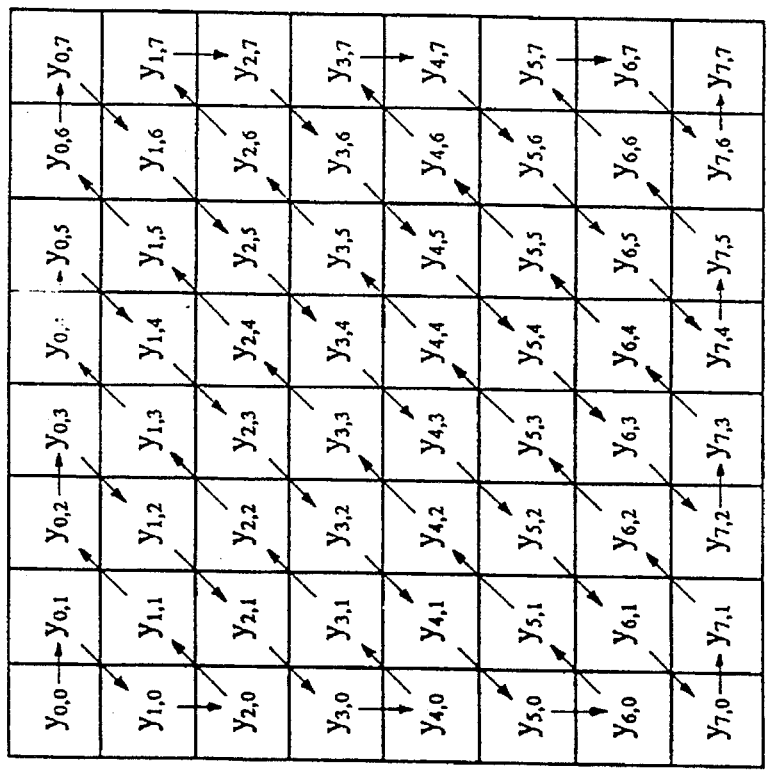
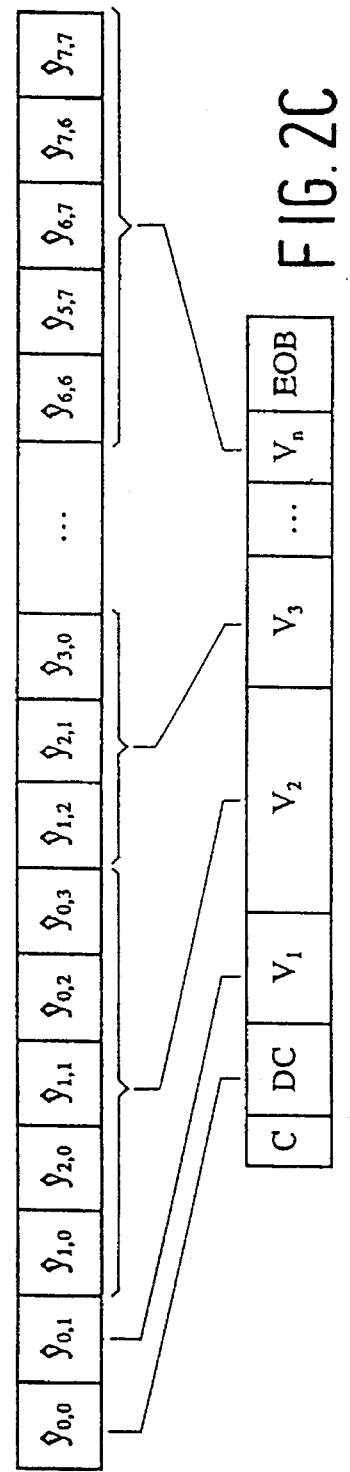

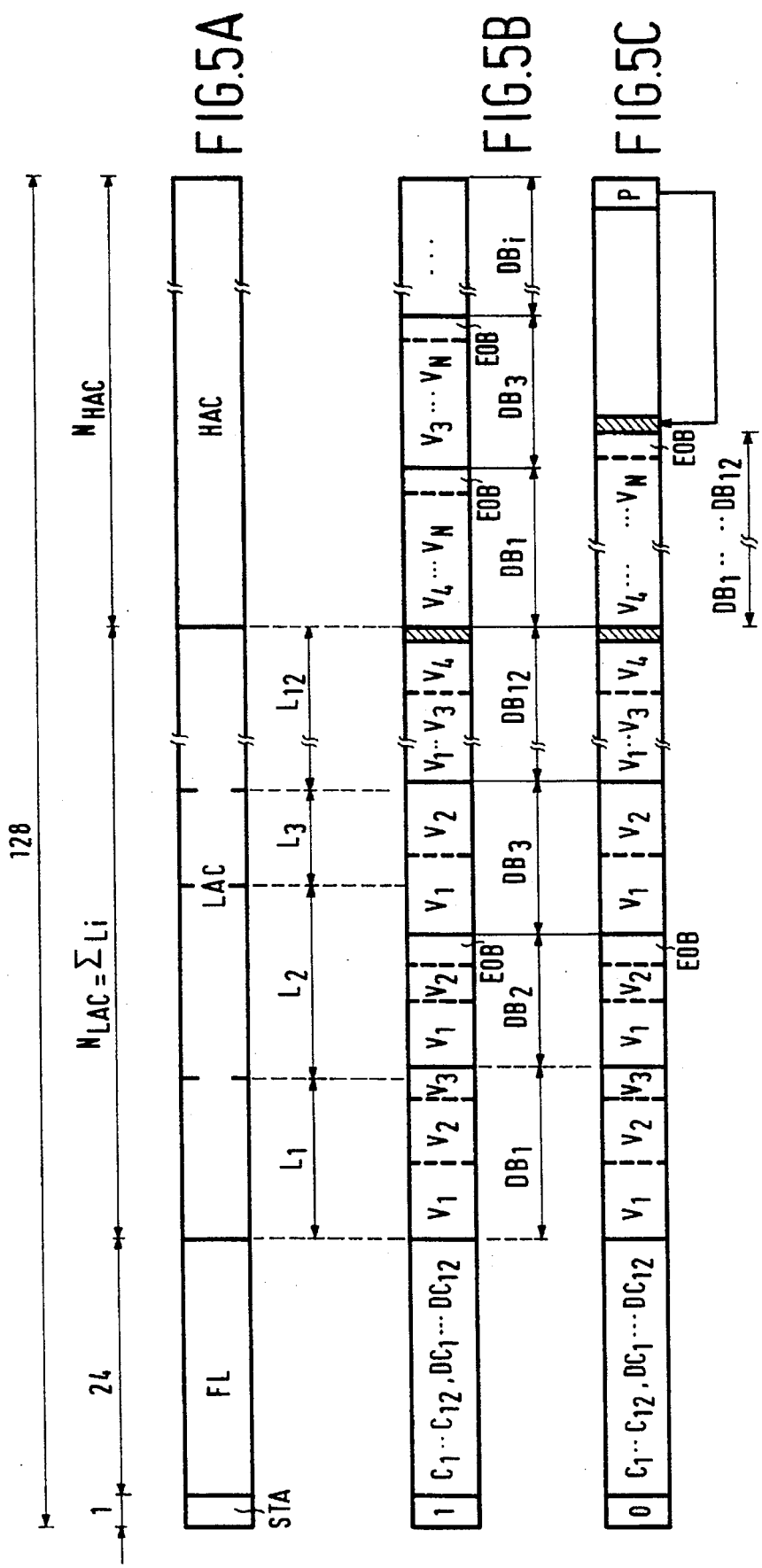

DEVICE FOR TRANSMITTING OR STORING DIGITAL TELEVISION PICTURES, AND DEVICE FOR RECEIVING SAID PICTURES

FIELD OF THE INVENTION

The invention relates to a device for transmitting or storing digital television pictures and to a device for receiving digital television pictures. The invention also relates to a storage medium on which digital pictures are stored.

DESCRIPTION OF THE PRIOR ART

For digital transmission and storage of television pictures, picture transform of two-dimensional blocks of, for example 8*8 pixels is generally used. By means of this transform, for example Discrete Cosine Transform (DCT), a block of coefficients is obtained whose number equals the number of pixels in each block. One of these coefficients, the DC coefficient, represents the average brightness or colour of the block. The other coefficients are AC coefficients. Each of them represents the extent to which a given picture detail is present.

The quantity of bits per picture is not reduced by the transform. Consequently, the digital picture signal is compressed before transmission or storage. This compression is obtained by quantizing the coefficients after scanning (serializing) and subjecting them to variable-length coding. Quantization leads to many coefficients having the value of zero. In variable-length coding, series of these zero coefficients are coded effectively. Coding of a series of zero coefficients at the end of a block may even be dispensed with because the end of a block is marked by an End-Of-Block (EOB) code. In this way each block of pixels is converted into a block of code words. Such a block, which comprises a variable number of code words of variable length, will hereinafter be referred to as data block. The transmission of variable-length code words instead of pixels or coefficients appears to provide the possibility of a considerable bit rate reduction. This is offset by the fact that the transmission of the code words is sensitive to transmission errors. A transmission error generally results in loss of synchronization at the receiver end. Not only the relevant code word but also the subsequent code words are no longer recognized.

In order to inhibit the loss of synchronization, U.S. Pat. No. 4,907,101 describes a device which comprises formatting means for accommodating the code words of the data blocks in corresponding channel blocks of fixed length. Such channel blocks may also be retrieved in the case of transmission errors because they are transmitted at known instants, or are stored at fixed positions on a storage medium (tape, disc). Moreover, channel blocks can be protected adequately by means of sync words, identification words and protection bits.

The known device accommodates as many as possible code words of each data block in a corresponding channel block. As far as the space in the channel block is not adequate, the surplus of data is accommodated in other channel blocks. If there is space left, the channel block will comprise the surplus data of other data blocks as well. The boundary between data of the corresponding data block and surplus data of other data blocks is constituted by the previously mentioned EOB code.

As described in said patent specification, the receiver comprises two decoders. A first decoder receives the channel blocks and is adapted to recognize the presence of the EOB code therein. By means of this decoder the received data stream is split up into data of corresponding data blocks and surplus data. A second decoder receives the data blocks and ensures their complete decoding. If the size of a channel block is exceeded during decoding of a data block, the data block will be completed with the split-off surplus data until the EOB code is recognized.

The known device has the drawback that said first decoder has a complicated structure and requires a large chip surface. In fact, detection of the EOB code requires recognition of at least the length of the preceding code words. The complexity of such an EOB detector is comparable with that of the second decoder, a full variable-length decoder. Consequently, the known device requires two complicated decoders.

A further drawback of the known device is the fact that a corresponding channel block is formed for each individual data block. The desired protection and identification of the channel blocks by means of sync words, identification words and protection bits thus requires a considerable overhead of bits.

OBJECT AND SUMMARY OF THE INVENTION

It is an object of the invention to provide a device for transmitting or storing television pictures in such a way that the pictures are transmitted reliably and can be decoded by a relatively simple receiver.

To this end, the device is characterized in that the formatting means are adapted to accommodate the start address of surplus data in a channel block at a predetermined position of said channel block. The boundary between data of corresponding data blocks and surplus data of other data blocks is now obtained at the receiver end by a simple downcount of bits. Length decoding of variable-length code words and EOB detection can be dispensed with. Since the start address is accommodated at a predetermined position of the channel block, the reliability of the split-up is not affected by a bit error in a variable-length code word.

A further embodiment of the device is adapted to refrain from transmitting the start address in the absence of surplus data in a channel block and to accommodate a status code for the absence at a farther predetermined position of the channel block. The transmission of the status code requires extra space (in principle, one bit per channel block), but practical experiments have proved that this is amply offset by the frequently occurring redundance of the (multibit) start address. If a channel block does not comprise any surplus data, the space which would be occupied by the start address is utilized for the transmission of code words.

The start address is preferably expressed in an integral number of fixed word lengths of, for example eight bits. Then, the start address does not only occupy fewer bits, but it aim simplifies the required circuitry for splitting up the data stream into corresponding data and surplus data. A possible space between data of the corresponding data block and surplus data is filled up with a dummy bit series. The start of a variable-length code word which is longer than said space may be used for this purpose, no separate definition of the dummy bit series will then be required.

A further embodiment of the device is characterized in that the formatting means are further adapted to accommodate selected code words of at least two data blocks in corresponding successive parts of a channel block. On the one hand, this leads to a reduction of overhead information (sync words, identification words, protection bits) because now a channel block is formed per group of at least two data blocks. It is also ensured that each channel block comprises at least selected code words of the corresponding data blocks, for example the code words of each data block which are representative of the DC coefficient and the most significant AC coefficients. If a group of data blocks does not completely fit in the channel block and consequently a part of the code words is accommodated in the form of surplus data in another channel block, this surplus data will always relate to the less significant AC coefficients. The selected code words of each data block can be regained by means of a simple downcount of bits without variable-length decoding and hence in a reliable way. Even in the case of trick modi of a video recorder, in which the head scans only a part of the tracks, a given minimum picture quality of a group of blocks can be reconstructed for each channel block which has been read.

It is to be noted that the accommodation of selected code words of data blocks in block sections has also been proposed in the non-prepublished European Patent Application EP-A 0 578 308. In the device described in this application each channel block comprises surplus data, even if the group of data blocks were to fit completely in a channel block. The start address of the surplus data is not transmitted separately but is formed by the end of the last block section in a channel block.

The formatting means are preferably adapted to accommodate a length code at predetermined positions of the channel block for each channel block section, which length code is indicative of the length of this block section. This provides the possibility of determining, for each separate data block, the number of selected code words which is required for a minimum picture quality. The length of the block sections of a channel block is then adapted thereto. It is feasible to transmit the exact length of each block section. In devices in which data blocks are classified as to picture energy content, the length code is, however, preferably constituted by the class of the data block. Since the class is transmitted anyway, the transmission of the length code does not require any extra transmission or storage space. The length code preferably represents an integral number of fixed word lengths of, for example, eight bits. A possible space in the last block section of the channel block can be filled up with a dummy bit series, preferably the start of a variable-length code word which is longer than the space to be filled up.

BRIEF DESCRIPTION OF THE FIGURES

FIGS. 2A, 2B, 2C and 3 show some diagrams to explain the operation of a coding station shown in FIG. 1.

FIGS. 5A, 5B, 5C, 6 and 7 show some diagrams to explain the operation of the formatting circuit shown in FIG. 4.

DESCRIPTION OF PREFERRED EMBODIMENTS OF THE INVENTION

General Structure

Figure 1:
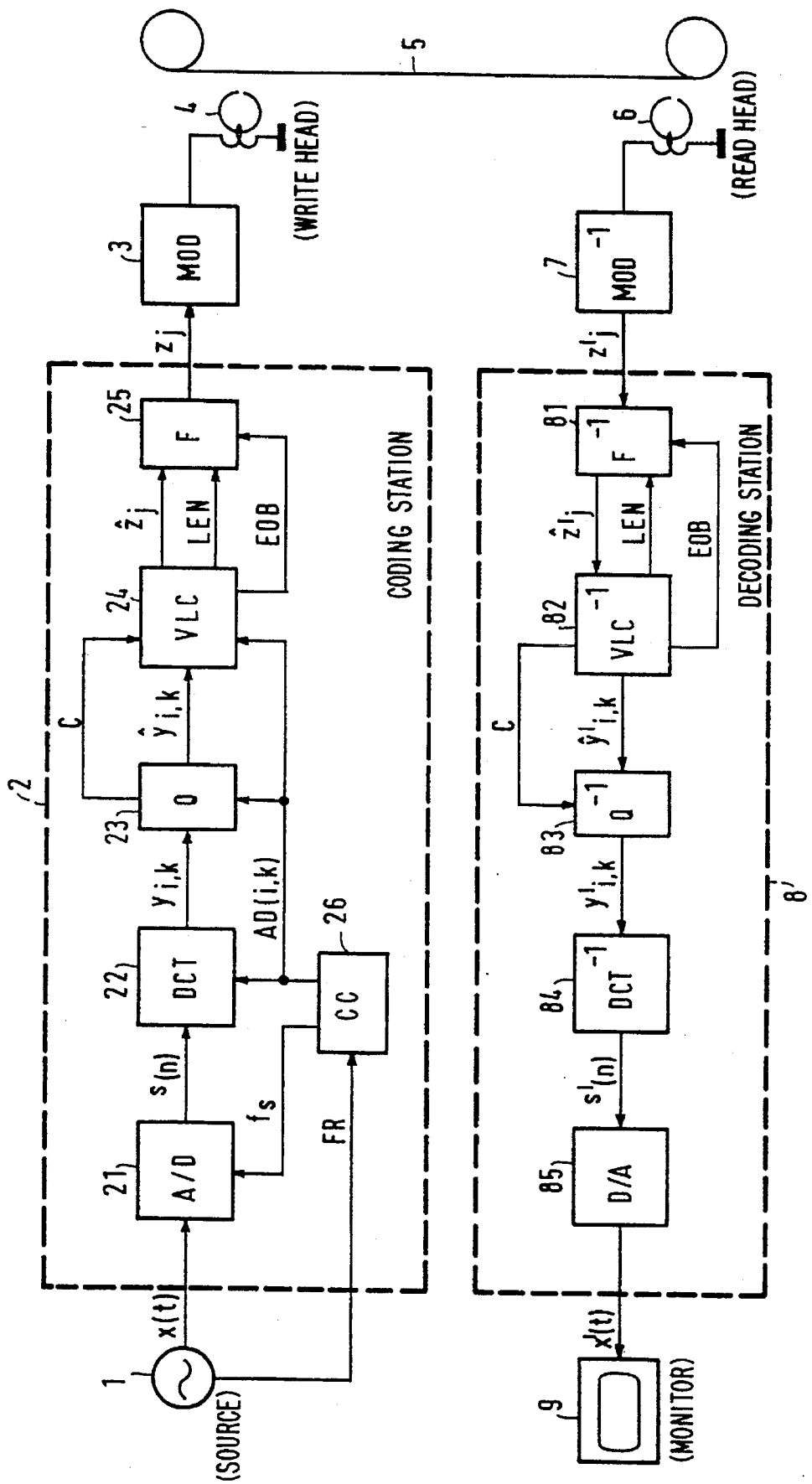
FIG. 1 shows diagrammatically a video recorder provided with a device for storing and a device for receiving television pictures according to the invention.

The invention will be described in greater detail with reference to a video recorder shown diagrammatically in FIG. 1. In this Figure the device for transmitting or storing television signals is constituted by a coding station 2 and the device for receiving television signals is constituted by a decoding station 8. The coding station receives an analog picture signal x(t) from a picture signal source 1 and supplies a serial channel bit stream $z_j$ which is applied via a modulation circuit 3 to a write head 4, by means of which this channel bit stream is recorded on a magnetic tape 5. To regain the original picture signal, a read head 6 is present which converts the information on the magnetic tape into an electric signal which, after demodulation in a demodulation circuit 7, yields a channel bit stream $z'_j$ which is applied to the input of the decoding station 8. The output of the decoding station supplies an analog picture signal x'(t) which is applied to a monitor 9.

The Coding Station

In the coding station 2 the analog picture signal x(t) is sampled at a suitable sampling frequency $f_s$ in an A/D converter 21. This sampling frequency is, for example 13.5 MHz for the luminance signal Y and 6.75 MHz for the colour difference signals U and V. The sampling operation yields an 8-bit picture signal sample s(n) for each pixel. These picture signal samples are subsequently applied to a forward two-dimensional Discrete Cosine Transformer (DCT) 22. Numerous examples of such a transformer are described in literature, for example in European Patent Application EP 0 286 184 so that in this respect it is sufficient to remark that the transformer supplies the coefficient block shown in FIG. 2A for each sub-picture of 8*8 pixels. The coefficients of such a block are denoted by $y_{i,k}$ in which i,k=0, 1, 2, ... 7. The coefficient $y_{0,0}$ represents the DC coefficient and is a measure of the average luminance Y or chrominance U, V of the sub-picture. The other coefficients $y_{i,k}$ with i,k≠0 are the AC coefficients. The coefficients are read consecutively, with the DC coefficient $y_{0,0}$ in the lead. The sequence is shown by means of arrows in FIG. 2A and is determined by a control circuit 26 which generates address words AD(i,k) for this purpose and applies them to the transformer 22.

The series of coefficients thus obtained is applied to a quantizing circuit 23. This circuit subjects the coefficients $y_{i,k}$ to a quantizing operation so that a quantized coefficient $\hat{y}_{i,k}$ is obtained for each coefficient $y_{i,k}$. Generally, the quantization is dependent on the position of the coefficient in the coefficient block. To this end the quantizing circuit 23 not only receives the coefficients but also the associated address words AD(i,k). Since many AC coefficients have a small value, many quantized coefficients $\hat{y}_{i,k}$ will have the value of zero. In this connection it is common practice to refer to these coefficients as zero coefficients and non-zero coefficients. The series of quantized coefficients $\hat{y}_{i,k}$ is shown in FIG. 2B.

A more and more frequent aim is to render the quantization also dependent on the extent to which the sub-picture comprises picture details. The quantity of picture detail is determined by the value of the AC coefficients and the spatial frequencies which they represent. An example of a quantizing circuit 23 in which the quantization is dependent on the extent of picture detail is described in U.S. Pat. No. 4,398,217. Here, the AC coefficients of a coefficient block are compared with the corresponding coefficients of a number of predetermined reference blocks each representing a picture detail class. The maximally corresponding reference block determines which picture detail class is allocated to the coefficient block. The AC coefficients of the block are now quantized also in dependence upon the class thus determined. The picture detail class is transmitted in the form of a classification code C to the decoding station. As there is more picture detail in the corresponding sub-picture of 8*8 pixels, C has a larger value. C will hereinafter be assumed to be a 2-bit number in which C=0 corresponds to the least picture detail and C=3 corresponds to the most picture detail.

The quantized coefficients $\hat{y}_{i,k}$ are subsequently applied to a variable-length coding (VLC) circuit 24 which subjects each coefficient block of 64 quantized coefficients $\hat{y}_{i,k}$ to variable-length coding and converts them into a series of code words of variable length. Moreover, the VLC coding circuit supplies the length LEN for each code word. A possible embodiment of the VLC coding circuit 24 is described in European Patent Application EP 0 260 748. In this embodiment an unambiguous code word is generated for each non-zero coefficient, together with the directly succeeding or preceding zero coefficients. The VLC coding circuit also receives the classification code C from the quantizing circuit 23, in order that this code is also transmitted as a code word to the decoding station. To distinguish one coefficient block from the other, each coefficient block is terminated by means of an End-Of-Block (EOB) code. This EOB code is supplied as soon as the VLC coding circuit of the control circuit 26 has received the last address word AD(7,7). It is to be noted that it is advantageous not to subject the DC coefficient to a variable-length coding but to a fixed length coding. The classification code C also has a fixed length.

The code words of a coefficient block constitute a data block. In this embodiment it is assumed that the VLC coding circuit 24 supplies the code words bit-serially so that a bit stream $\hat{z}_j$ is obtained. The bit stream corresponding to a data block is shown in FIG. 2C. As is apparent from this Figure, the data block successively comprises: the classification code C having a fixed length of, for example 2 bits, the DC coefficient having a fixed length of, for example 9 bits, a variable number of variable-length code words $V_1, V_2, \ldots V_n$ and the EOB code having a fixed length of, for example 5 bits.

Figure 3:
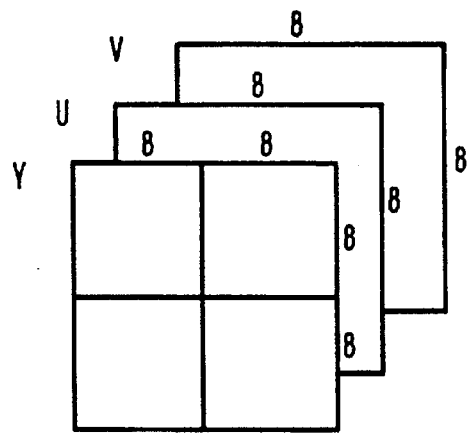

The afore-mentioned operations are used for the luminance signal Y as well as for the chrominance signals U and V. If the sample frequency of the chrominance signal in the horizontal and vertical directions amounts to half the sample frequency of the luminance signal, one chrominance block U and one chrominance block V is obtained for every four luminance blocks Y. In this respect it is common practice to speak of a macro block. Such a macro block is shown symbolically in FIG. 3.

The code words of a group of data blocks and their respective length LEN are subsequently applied to a formatting circuit 25 which forms the channel bit stream $z_j$. The formatting circuit will hereinafter be described in greater detail.

The Formatting Circuit

Figure 4:
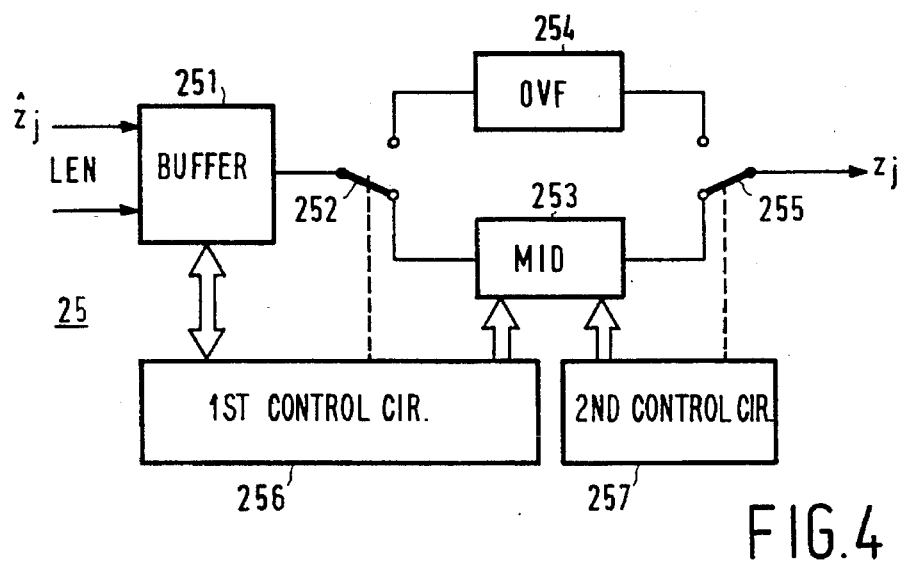
FIG. 4 shows an embodiment of a formatting circuit shown in FIG. 1.

FIG. 4 shows diagrammatically an embodiment of the formatting circuit 25. The circuit comprises successively a buffer memory 251, a distributor switch 252, a first memory 253, a second memory 254 and a multiplex switch 255. The first memory 253 will hereinafter be referred to as MID memory (most important data). The second memory 254 will hereinafter be referred to as OVF memory (overflow). A first control circuit 256 is coupled to the buffer 251, controls the distributor switch 252 and supplies a write address for the MID memory. A second control circuit 257 controls the multiplex switch 255 and supplies a read address for the MID memory.

The first control circuit 256 is adapted to distribute the code words of the group of data blocks stored in the buffer 251 among the memories 253 and 254. It will hereinafter be assumed that a group of twelve data blocks is processed each time. These twelve data blocks are referred to as $DB_1 \ldots DB_{12}$ and correspond to a double macro block comprising two contiguous macro blocks (see FIG. 3).

The MID memory has a layout as shown in FIG. 5A. It is 128 bytes long and comprises a first byte STA for storing status information, a section FL having a length of 24 bytes for storing fixed-length code words, a section LAC for storing variable-length code words which represent low-frequency AC coefficients and a remaining section HAC for storing other variable-length code words. The size of the LAC section is determined by the control circuit 256 for each double macro block. More particularly, the LAC section for each data block $DB_i$ comprises a memory section having a length $L_i$ which is dependent on the classification code C of a data block $DB_i$. As already previously stated, C may assume the values 0 . . . 3, dependent on the extent of picture detail in the corresponding sub-picture. In the control circuit a length L is fixed for each value of C. In this example the length for C=0 is two bytes, for C=1 three bytes, for C=2 four bytes and for C=3 six bytes.

Figure 6:
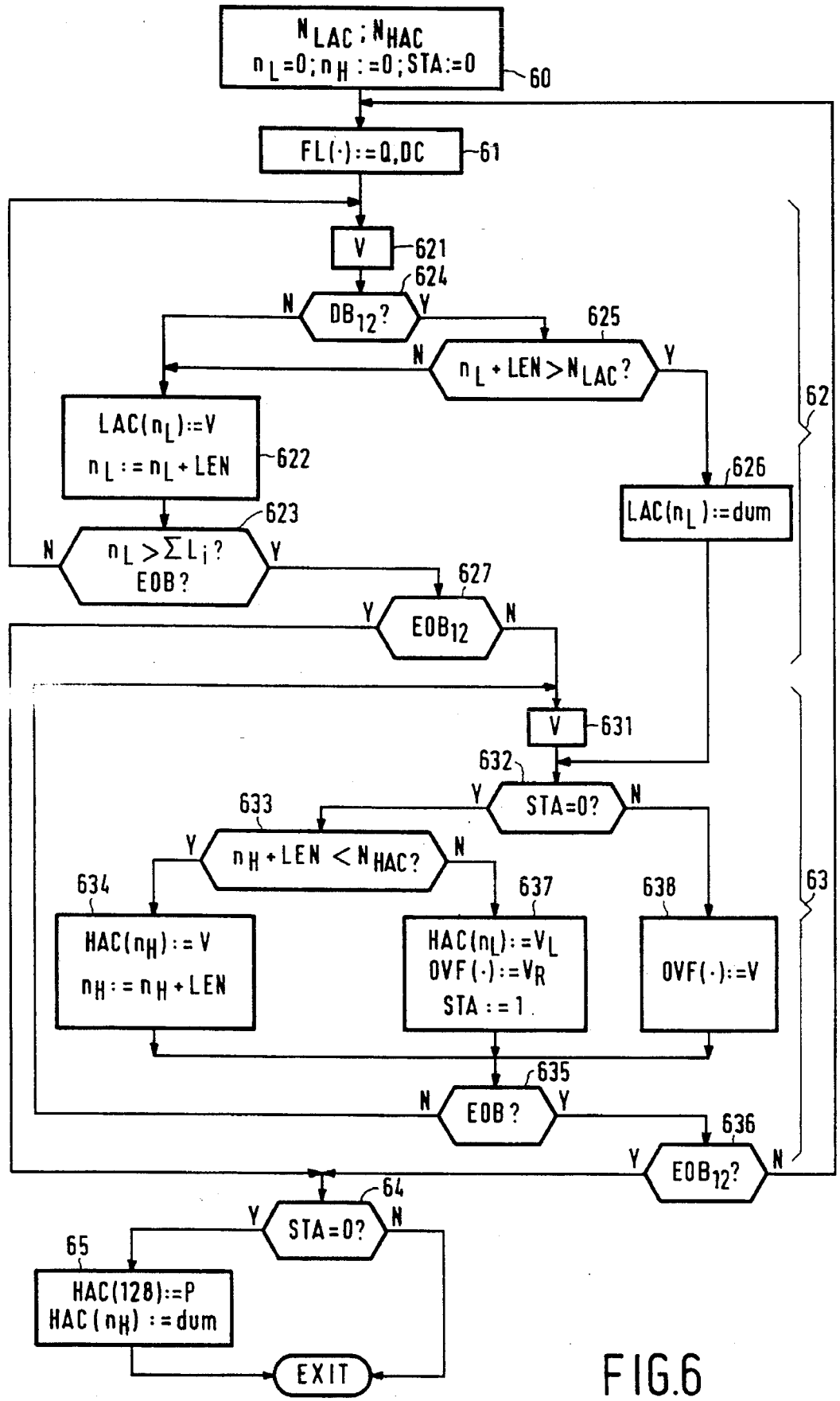

The operation of the control circuit 256 will now be explained with reference to a flow chart shown in FIG. 6. In a step 60 the operation of processing a double macro block is initialized. In this initialization step the control circuit reads the classification code C of the twelve data blocks from memory buffer 251 and sums the corresponding lengths $L_i$. The sum thus obtained constitutes the length $N_{LAC}$ of the LAC section of the MID memory. Moreover, the control circuit fixes the remaining length $N_{HAC}$ of the HAC section. Subsequently, the circuit initializes two memory addresses $n_L$ and $n_H$ which represent a bit position within the LAC and HAC sections, respectively, of the MID memory. Both addresses have the initial value 0. Moreover, the logic value 0 is assigned to one of the bits in the status byte STA (see FIG. 5A). The significance of this status bit will be described in greater detail.

After this initialization the successive code words (see FIG. 2C) of a data block $DB_i$ are transferred from buffer memory 251 to one of the memories MID or OVF. In a step 61 the control circuit stores the first two code words (the fixed length classification code C and DC coefficient) at fixed, predetermined positions of the FL section of the MID memory. In a process 62 a number of variable-length code words of data block $DB_i$ is subsequently stored in the LAC section of the MID memory. This is realised as follows. A code word V is read (step 621) and in a step 622 it is stored in the LAC section from bit position $n_L$. Subsequently, the bit position $n_L$ is raised by the length LEN of the stored code word. In a step 623 it is subsequently ascertained whether the stored code word is an EOB code or whether the end of the memory section has been exceeded due to storage of the code word. The end of the memory section is then determined by the sum of the lengths $L_i$ which correspond to the classification codes C of the data blocks $DB_1 \ldots DB_i$ processed so far. If the end of the memory section has not been exceeded and if the stored code word is not an EOB code, the circuit returns to the step 621 so as to store the next code word in the memory section. In this way, each memory section of the LAC section with length $L_i$ is filled as much as possible with variable-length code words V1, V2 etc. (see FIG. 2C) of a corresponding data block $DB_i$. These code words are representative of the most significant AC coefficients of this block.

As is apparent from the foregoing, the code word stored last in a memory section may exceed the end of this memory section (expressed in an integral number of bytes). There is one exception. A code word of the last data block $DB_{12}$ must not exceed the length of the LAC section. This is achieved by ascertaining for each code word of the last data block $DB_{12}$ (step 624) whether this code word can still be fury stored in the LAC section (step 625). If the code word no longer fits, the LAC section is completed with dummy bits in a step 626.

After the most important variable-length code words of a data block $DB_i$ have been stored in a corresponding memory section of the LAC section, the other code words of this data block are stored. This operation takes place in a process 63. In a step 631 of this process the subsequent code word V of data block $DB_i$ is read. In a step 632 it is ascertained whether the status bit STA has the logic value 0. By means of this value the status bit indicates that the code word is stored in the HAC section of the MID memory. The distributor switch 252 is then in the position as shown in FIG. 4. As yet, the status bit will have the value 0. In a step 633 it is subsequently ascertained whether the code word V fits in the HAC section of the MID memory. If this is the case, the code word is stored in this section from bit position $n_H$ in a step 634. Subsequently, the bit position $n_H$ is raised by the length LEN of the stored code word. In a step 635 it is ascertained whether the stored code word is an EOB code. If this is not the case, the subsequent code word is read (step 631). If this is the case and if not all data blocks have been processed (step 636), the control circuit returns to the step 61 so as to process the subsequent data block.

In this way all other code words of the data block are successively stored in the HAC section of the MID memory until it appears in the step 633 that the relevant code word no longer completely fits in the HAC section. In that case a step 637 is performed. In this step the code word is stored in the HAC section in so far as it fits in this section. This still fitting part is denoted by $V_L$ in FIG. 6. The control circuit subsequently puts the distributor switch 252 (see FIG. 4) in the other position. Consequently, the other bits of the code word ($V_R$) are stored in the OVF memory. Moreover, the logic value 1 is allocated to the status bit STA. The result is that all subsequent code words of the data block are stored in the OVF memory in a step 638. This OVF memory thus constitutes a buffer for data which no longer fits in the MID memory. This data is referred to as surplus data.

Steps 627 and 636 in FIG. 6 will now be described. In these steps it is ascertained whether the EOB code of the last data block $DB_{12}$ has been processed. In that case the distribution of code words among the two memories MID and OVF is terminated. The control circuit now checks in a step 64 whether the status bit STA has maintained the logic value 0. The twelve data blocks are then completely stored in the MID memory and storage of surplus data in the OVF memory has not taken place. In that case the start address of the still remaining space in the MID memory is computed on the basis of bit position $n_H$ in a step 65. This start address, rounded off upwards to an integral number of bytes, is stored in the last memory location of the MID memory in the form of a pointer P. The remaining space between the last code word and the rounded-off start address is filled with dummy bits.

FIG. 5B shows a first example of the distribution of code words of a double macro block in the MID memory. The classification codes C and the DC coefficients of the twelve data blocks are at fixed positions of the FL section. The first memory section of the LAC section (with length $L_1$) accommodates the variable-length code words V1, V2 and V3 of $DB_1$, in which V3 has exceeded the length $L_1$. The second memory section appears to have accommodated all code words of $DB_2$, including its EOB code. Consequently, the first code word V1 of the third data block $DB_3$ can already start in the second memory section. V1 ... V4 of the last data block $DB_{12}$ are stored in the LAC section. The code word V5 would have caused exceeding of this section. It has been attempted to indicate by way of a shaded area that the LAC section is completed with dummy bits. For the sake of completeness it is to be noted once more that the length $L_i$ of each memory section is directly coupled to the value of the corresponding classification code C in the FL section. The HAC section is filled with the other code words, starting at V4 ... VN and EOB of $DB_1$. The twelve data blocks appear to have such a total length that not all code words fit in the MID memory. This is indicated by the status bit STA which has the logic value 1. The surplus data is stored in the OVF memory, contiguous to surplus data of previous double macro blocks.

FIG. 5C shows a second example of the distribution of code words of a double macro block in the MID memory. In this example all code words of the twelve data blocks appear to have been accommodated in the memory. The status bit therefore has the value 0 and a pointer P points at the start address of the still empty space in the HAC section of the memory. It has been attempted to indicate by way of a shaded area that the space between the last code word and the byte limit determined by P is filled with dummy bits.

Figure 7:
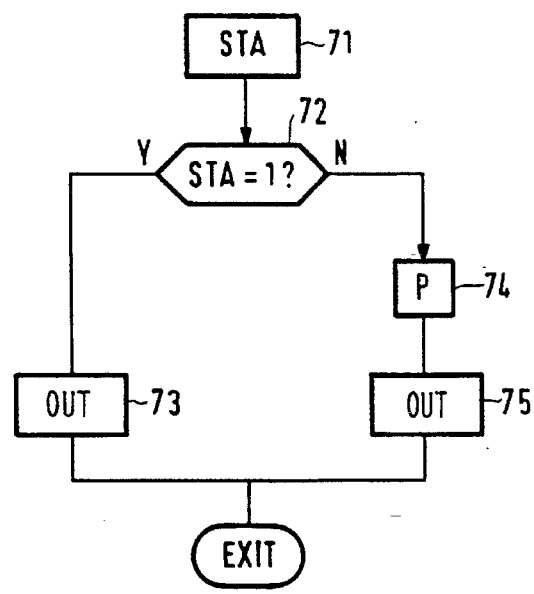

Reverting to FIG. 4, it appears that the data stored in the memories MID and OVF are combined by the multiplex switch 255 under the control of the second control circuit 257 to a channel bit stream $z_j$ to be transmitted. The operation of this second control circuit will now be explained with reference to a flow chart which is shown in FIG. 7.

In a step 71 the control circuit reads the status bit STA into the MID memory. In a step 72 it is ascertained whether the status bit has the logic value 1. If this is the case, the MID memory is completely filled with data of the double macro block. In a step 73 all 128 bytes of MID memory are applied to the output via the multiplex switch. If the status bit has the logic value 0, the circuit writes the value P into the MID memory in a step 74. Subsequently the circuit successively applies to the output in a step 75: the first P bytes from the MID memory, 127-P bytes from the OVF memory and one byte of the value of P itself.

In this way a channel block of 128 bytes is transmitted for each double macro block. The division of such a channel block is apparent from FIGS. 5B and 5C and thus need not be explained separately. It is only to be noted that the "empty" space shown in FIG. 5C is filed upon transmission with surplus data which will generally originate from other double macro blocks. It should be emphasized that each channel block in any case comprises the code words which are representative of a given extent of picture detail of the two corresponding macro blocks. As is apparent from FIGS. 5B and 5C, the pointer P only occupies transmission space if this is really necessary. In the absence of surplus data in the channel block, the relevant byte is available for transmission of code words.

The Decoding Station

In the decoding station 8 (see FIG. 1) the received channel bit stream $z'_j$ successively traverses a deformatting circuit 81, a variable-length decoding circuit 82, an inverse quantizing circuit 83, an inverse DCT circuit 84 and a D/A converter 85. The deformatting circuit 81 will be described in greater detail. The other circuits are generally known and will not be further described.

The Deformatting Circuit

Figure 8:
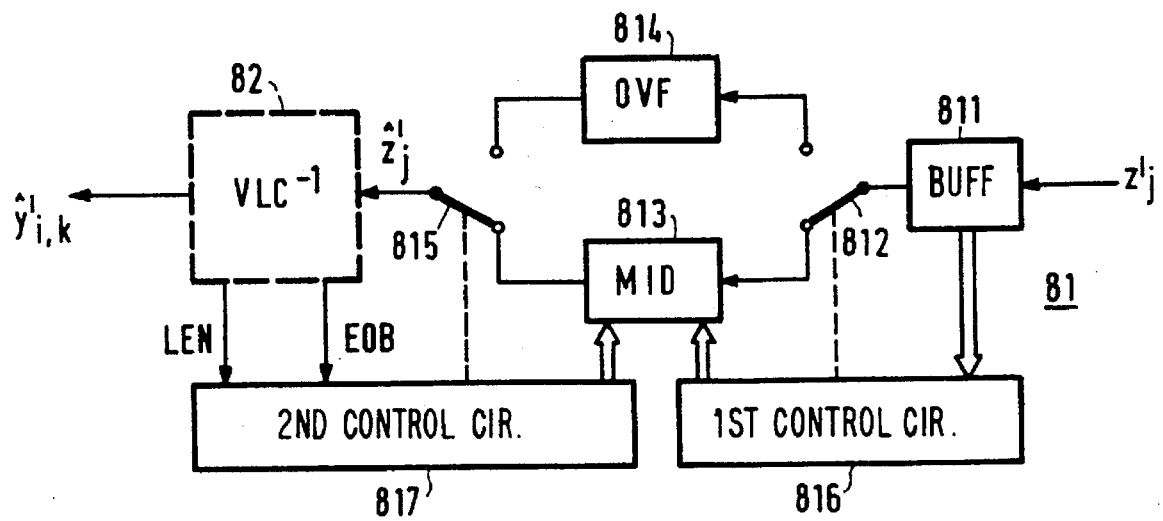
FIG. 8 shows an embodiment of a deformatting circuit shown in FIG. 1.

The deformatting circuit 81 which is shown diagrammatically in FIG. 8 has the same structure as the formatting circuit 25 (see FIG. 4). The circuit comprises a channel block buffer 811, a distributor switch 812, a first memory 813, a second memory 814 and a multiplex switch 815. The two memories 813 and 814 will hereinafter be referred to again as MID memory and OVF memory, respectively. A first control circuit 816 is coupled to channel block buffer 811, controls the distributor switch 812 and supplies a write address for the MID memory. A second control circuit 817 supplies a read address for the MID memory and controls the multiplex switch 815. It is also coupled to the variable-length decoder 82 (see also FIG. 1).

Figure 9:
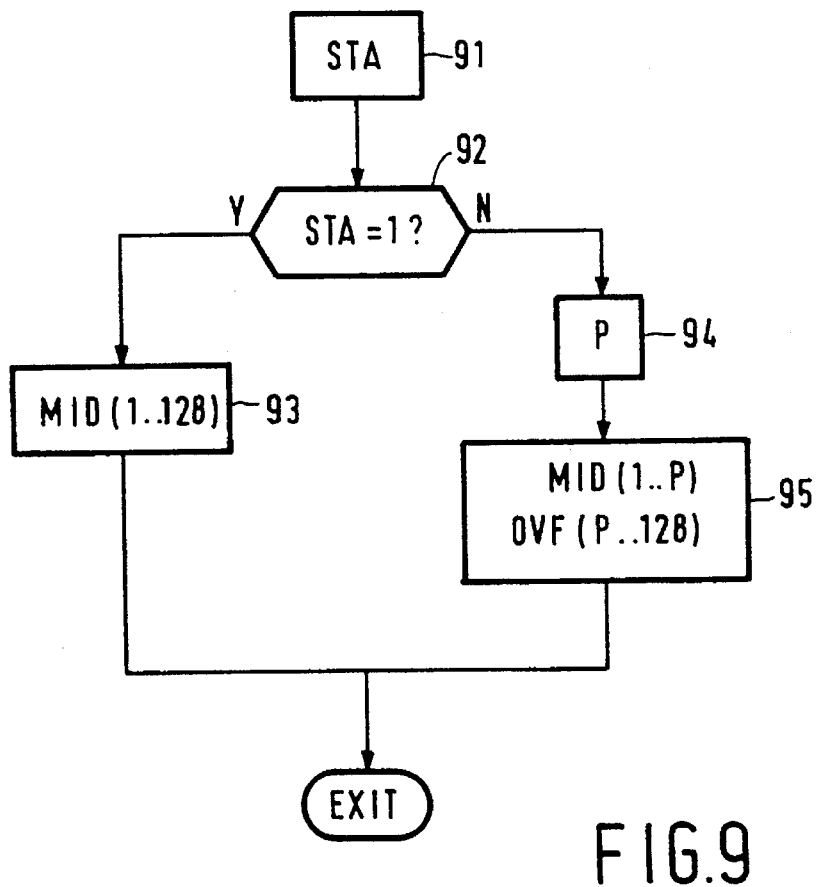
FIGS. 9, 10A, 10B and 10C show some diagrams to explain the operation of the deformatting circuit shown in FIG. 8.

The first control circuit 816 is adapted to distribute the data in each channel block among the memories M/D and OVF. This distributing operation will be explained with reference to a flow chart shown in FIG. 9. In a step 91 the status bit STA is read and in a step 92 it is ascertained whether the status bit has the logic value 1. If this is the case, the complete channel block is stored in the MID memory via the distributor switch in a step 93. If the status bit has the logic value 0, the circuit reads the value P in a step 94. Subsequently, the circuit writes P bytes into the MID memory and writes the other data into the OVF memory. After this distributing operation the MID memory comprises code words of a corresponding double macro block. The way in which these code words are stored is in full conformity with FIGS. 5B or 5C. The MID memory thus has an FL section of 24 bytes, a LAC section comprising twelve memory sections of length $L_i$ and a remaining HAC section. The data in OVF memory is surplus data of other macro blocks.

Figure 10A:
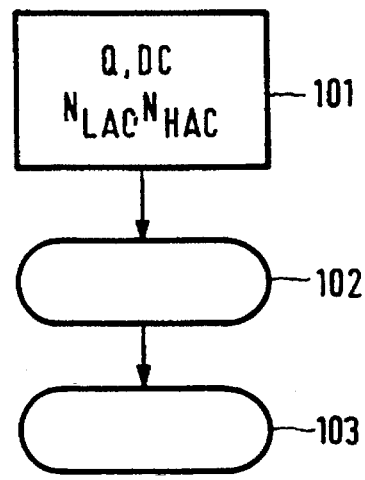

After a channel block has been split in this way, a recombination of the code words of a double macro block and its variable-length decoding follow. This is effected under the control of the second control circuit 817 whose operation will be explained with reference to a flow chart shown in FIG. 10A. Suasive code words are first read from the MID memory via the multiplex switch 815 (see FIG. 8) and applied to the variable-length decoding circuit 82. As is apparent from FIGS. 5B and 5C, the classification code C and the DC coefficient of the twelve data blocks are initially concerned. In a step 101 they are stored in a corresponding coefficient block by the variable-length decoding circuit. During reading of the classification code C the control circuit also determines the length $L_i$ of each LAC memory section, the total length $N_{LAC}$ of the LAC section and the remaining length $N_{HAC}$ of the HAC section.

Figure 10B:
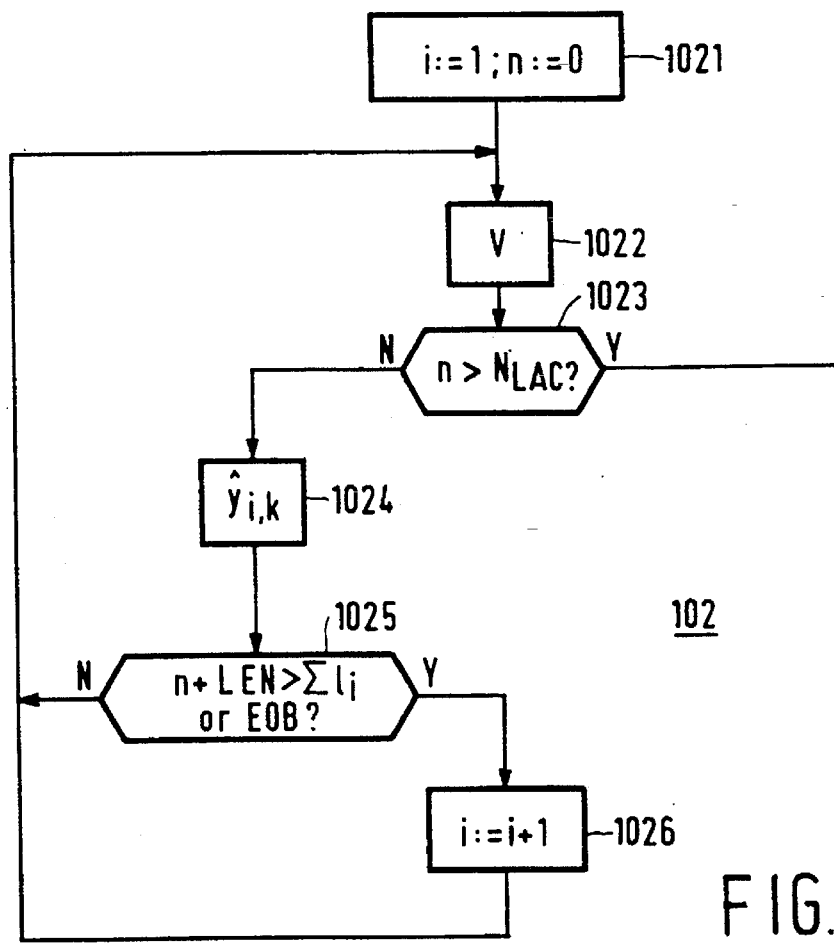
Figure 10:
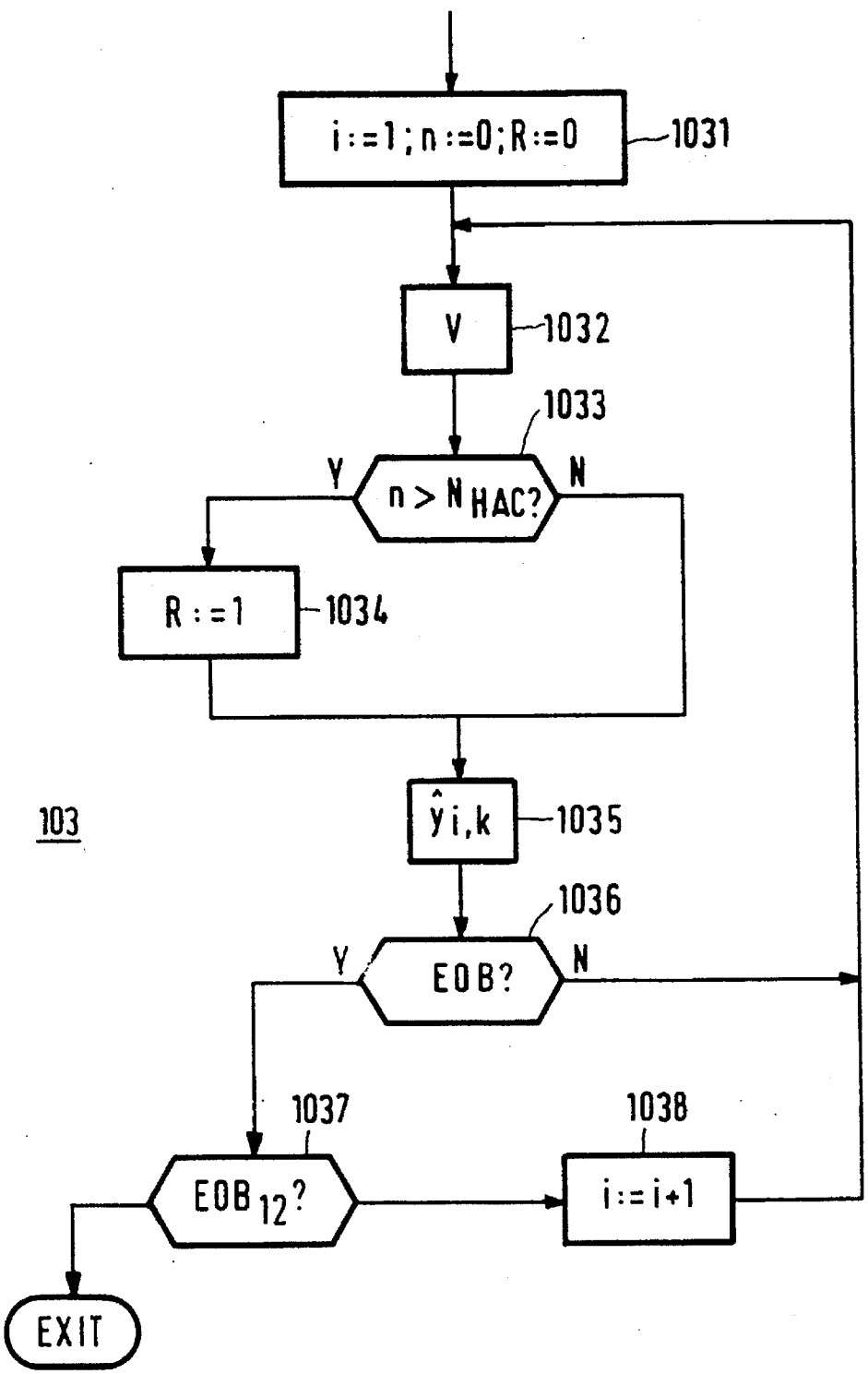

Subsequently the successive code words V are read from the LAC section in a process 102. This process is further shown in FIG. 10B. In a step 1021 a data block counter i and a bit position counter n are initialized. Subsequently, each code word is read and applied to the variable-length decoder (step 1022). In a step 1023 it is ascertained whether the end of the LAC section is reached. As yet, this is not the case. The code word V which has been read represents one or more AC coefficients. In a step 1024 these coefficients $\hat{y}_{i,k}$ are decoded by the variable-length decoder and stored in a corresponding coefficient block. Subsequently the circuit ascertains in a step 1025 whether the limit $\Sigma L_i$ of the current LAC memory section has been exceeded or whether the decoded code word was an EOB code. If this is the case, the data block counter i is raised by 1 (step 1026) so as to indicate that the subsequent code words originate from a subsequent data block $DB_i$. Subsequently, the next code word is read. The process 102 is left as soon as it has been determined in step 1023 that all code words are written into the LAC section. This is the case when the bit position counter n exceeds the length $N_{LAC}$ during reading of a code word before the code word is decoded by the variable-length decoder.

The circuit now continues with a process 103 (see FIG. 10A) in which the other code words are read from the HAC section. This process is further shown in FIG. 10C. In a step 1031 the data block counter i and the bit position counter n are reinitialized. The bit position counter now points at the position in the HAC section of the MID memory. Moreover, in this step the logic value 0 is assigned to a routing bit R. This routing bit controls the position of multiplex switch 815 (see FIG. 8). The MID memory is selected for R=0 and the OVF memory is selected for R=1. In a step 1032 a code word is read from the selected memory. As yet, this will be the MID memory. In a step 1033 it is ascertained whether the limit of the HAC section is reached. If this is not the case, the HAC section supplies a complete code word V. If this is the case, it is a code word which is no longer completely accommodated in the MID memory. In a step 1034 the muting bit then obtains the value 1 so that the multiplex switch is put into its other position. The rest of the code word as well as any subsequent code word is then read from the OVF memory. The code word V which has thus been read is decoded in a step 1035 by the variable-length decoder and stored as coefficient $\hat{y}_{i,k}$ in the corresponding coefficient block. In a step 1036 it is ascertained whether the decoded code word is an EOB code. If this is not the case, the subsequent code word is read. If this is the case, the data block counter i is first raised by 1 (step 1038). In this way all code words of a double macro block are decoded until the last EOB code (step 1037) is found.

Further Remarks

To avoid overflow of the OVF memory, the length of the channel blocks and the number of channel blocks per television picture will have to be in conformity with the quantity of data. However, it is not necessary for the length of a channel block to correspond to the average length of a double macro block. If for certain reasons a smaller length of channel blocks is desired, the transmission of a plurality of channel blocks with corresponding data can be alternated with channel blocks with surplus data only. In that case the status byte of each channel block also comprises an indication indicating the channel block type.

It may further be noted that the channel blocks need not necessarily start at equidistant bit positions. For the sake of robustness of the channel bit stream it is sufficient when the bit positions at which each channel block starts have been predetermined and are known at the receiver end. In practice, different formats for recorders for consumer and professional use can be standardized. The same applies to the transmission and recording of standard TV signals and HDTV signals.

We claim:

1. A device for transmitting or storing digital television pictures, comprising:

means for dividing each television picture into blocks of pixels;

coding means for coding each block of pixels in a corresponding data block of code words of variable length;

formatting means for accommodating the code words of a data block in a corresponding channel block of fixed length, in which a surplus of data of the data block is accommodated in other channel blocks and a shortage of data in a channel block is filled up with the surplus of data of other data blocks;

wherein said formatting means are adapted to accommodate the start address of surplus data in a channel block at a predetermined position of said channel block.

2. A device as claimed in claim 1, wherein the formatting means are adapted to refrain from transmitting the start address in the absence of surplus data in a channel block and to accommodate a status code for the absence at a further predetermined position of the channel block.

3. A device as claimed in claim 2, wherein the address is expressed in an integral number of fixed word lengths.

4. A device as claimed in claim 1, wherein the address is expressed in an integral number of fixed word lengths.

5. A device as claimed in claim 4, which is further adapted to fill up the space between data of the corresponding data block and surplus data with the start of a variable-length code word which is longer than said space.

6. A device as claimed in claim 1 wherein the formatting means are further adapted to accommodate selected code words of at least two data block in corresponding successive sections of a channel block, while a length code which is indicative of the length of a channel block section is accommodated at predetermined positions of the channel block for each channel block section.

7. A device as claimed in claim 6, wherein the coding means are adapted to classify data blocks as to picture energy content, the length code being constituted by the class of the data block.

8. A device as claimed in claim 7, wherein the length code represents an integral number of fixed word lengths.

9. A device for receiving digital television pictures in the form of a series of channel blocks of fixed length, comprising:

deformatting means for splitting channel blocks into code words of a corresponding data block and surplus data of other data blocks and for adding surplus data to the code words of the corresponding data block;

decoding means for decoding the data blocks in television pictures;

wherein the deformatting means are adapted to perform said split-up of a channel block in response to an start address of the surplus data accommodated in the channel block.

10. A device as claimed in claim 9, adapted to allocate code words accommodated in predetermined successive parts of a channel block to corresponding data blocks, the length of each block section being fixed in response to a length code accommodated in the channel block for said purpose.

11. A storage medium on which digital television pictures are stored, which are coded in the form of a series of data blocks with code words of variable length, characterized in that the code words of a data block are stored in a corresponding channel block of fixed length, a surplus of data of the data block being accommodated in other channel block and a shortage of data in a channel block being filled up with the surplus data of other data blocks, while the start address of the surplus data is stored at a predetermined position of the channel block.

12. A storage medium as claimed in claim 11, wherein selected code words of at least two data blocks are accommodated in corresponding successive sections of a channel block, while a length code which is indicative of the length of a channel block section is accommodated at predetermined positions of the channel block for each channel block section.

13. A storage medium as claimed in claim 11, wherein the storage of the start address is dispensed with in the absence of surplus data in a channel block and a status code for the absence is stored at a further predetermined position of the channel block.

14. A storage medium as claimed in claim 13, wherein the address is expressed in an integral number of fixed word lengths.

15. A storage medium as claimed in claim 11, wherein the address is expressed in an integral number of fixed word lengths.

16. A storage medium as claimed in claim 15, wherein the space between data of the corresponding data block and surplus data is filled up with the start of a variable-length code word which is longer than said space.

17. A storage medium as claimed in claim 16, wherein selected code words of at least two data blocks are accommodated in corresponding successive sections of a channel block, while a length code which is indicative of the length of a channel block section is accommodated at predetermined positions of the channel block for each channel block section.

* * * * *